(12) United States Patent
Odell

(10) Patent No.: US 6,815,651 B2
(45) Date of Patent: Nov. 9, 2004

(54) OPTICAL POSITION MEASUREMENT SYSTEM EMPLOYING ONE OR MORE LINEAR DETECTOR ARRAYS

(75) Inventor: Don Odell, Milton, VT (US)

(73) Assignee: Ascension Technology Corporation

( * ) Notice: Subject to any disclaimer, the term of this patent is extended or adjusted under 35 U.S.C. 154(b) by 0 days.

(21) Appl. No.: 10/339,299

(22) Filed: Jan. 10, 2003

(65) Prior Publication Data

US 2004/0135069 A1 Jul. 15, 2004

(51) Int. Cl.[7] .................... G01C 21/02; G01C 21/24; G01J 1/20
(52) U.S. Cl. ............... 250/203.1; 250/221; 244/158 R
(58) Field of Search ............... 250/203.1–203.4, 250/203.6, 221, 206, 206.1, 206.2; 356/139.02, 152.1, 139.2; 244/158 R

(56) References Cited

U.S. PATENT DOCUMENTS

| | | | | |
|---|---|---|---|---|
| 4,315,690 A | * | 2/1982 | Trocellier et al. | 356/139.03 |
| 4,794,245 A | * | 12/1988 | Auer | 250/206.2 |
| 4,810,870 A | * | 3/1989 | Tsuno et al. | 250/206.1 |
| 5,023,440 A | * | 6/1991 | Kuppenheimer, Jr. | 250/203.6 |

* cited by examiner

Primary Examiner—Stephone B. Allen
Assistant Examiner—Patrick J. Lee
(74) Attorney, Agent, or Firm—H. Jay Spiegel

(57) ABSTRACT

In a first embodiment, a single linear array of bi-cell optical detectors is arranged with each bi-cell optical detector having a rectangular aperture located a prescribed distance above the surface of the bi-cell optical detector. In the first embodiment, in calculating the position of a point source emitter, it is understood that each detector receives light from the point source emitter at a unique angle different from the angles at which the other detectors receive light from the point source emitter. A plot of detector ratios is made by taking the best fit line through the ratios from each detector and the location of the point where the detector ratio is zero yields the point of perpendicularity between the emitter and the linear detector array. Another embodiment contemplates a three dimensional detector having three linear arrays of bi-cell detectors arranged at the periphery of a measuring space mutually orthogonal to one another. Calculation of the x, y and z intercepts through calculations of lines of regression or planar intercepts allows one to calculate the x, y and z coordinates of the point source emitter.

19 Claims, 4 Drawing Sheets

$$\mathrm{Tan}(\Theta) = K*[(X+) - (X-)]/[(X+) + (X-)]$$

OPTICAL POSITION MEASUREMENT SYSTEM EMPLOYING ONE OR MORE LINEAR DETECTOR ARRAYS

BACKGROUND OF THE INVENTION

The present invention relates to an optical position measurement system employing one or more linear detector arrays. Typical optical measurement systems used for motion capture applications use multiple cameras to maintain a line of site to emitters placed on a movable object. Each camera must be calibrated with respect to all other cameras to arrive at a common coordinate system. Furthermore, the cameras that are used typically employ CCD arrays, each containing large numbers of elements so that processing of signals is intensive and costly. A system that could maintain accuracy while reducing costs and complications in measuring would provide significant advantages over the prior art. It is with these thoughts in mind that the present invention was developed.

SUMMARY OF THE INVENTION

The present invention relates to an optical position measurement system employing one or more linear detector arrays. The present invention includes the following interrelated objects, aspects and features:

(1) In a first embodiment of the present invention, a single linear array of bi-cell optical detectors is arranged with each bi-cell detector having a rectangular aperture located a prescribed distance above the surface of the bi-cell detector. While two or three such detectors in a linear array would be sufficient for most measurements, in order to accommodate to the fact that one or more detectors in an array may be blocked from line of sight with the point source emitter at any one time or another, in the preferred embodiment, at least four and perhaps eight or more detectors in a linear array may be provided. Each bi-cell detector has an active area including at least two detecting regions adjacent one another. Bi-cell optical detectors allow detection that is not dependent on uniformity of source radiation, but is only dependent on the angle of incidence of source radiation.

(2) As in any position measurement system, it is important to ensure that resolution of emitter position over a wide range of emitter locations is kept as high as possible. Typically, high resolution of far away emitter positions requires large spacing between adjacent detectors. Conversely, to achieve high resolution at close ranges, the detectors are preferably wide angle detectors closely spaced apart. In order to accommodate to all different lengths of ranges between the point source emitter and the detector array, in the preferred embodiment, a large number of detector locations are used while keeping each detector as simple as possible.

(3) In the first embodiment of the present invention, in calculating the position of a point source emitter, it is understood that each detector receives light from the point source emitter at a unique angle different from the angles at which the other detectors receive light from the point source emitter. A plot of detector ratios is made by taking the best fit line through the ratios from each detector and the location of the point where the detector ratio is zero yields the point of perpendicularity between the emitter and the linear detector array. This location is determined by calculating, for each detector, the tangent of the angle of incidence of a beam of light at each detector.

(4) The same principles set forth above concerning a one dimensional detector array are equally applicable to determine the particular location of a point source emitter in two or three dimensions. In the example of a three dimensional detector, three linear arrays of bi-cell detectors are arranged at the periphery of a measuring space mutually orthogonal to one another. Calculations of the x, y and z intercepts through calculations of the tangent of the angle between each detector and the point source emitter allows one to calculate the x, y and z coordinates of the point source emitter.

As such, it is a first object of the present invention to provide an optical position measurement system employing one or more linear detector arrays.

It is a further object of the present invention to provide such a device in which, in one embodiment thereof, a multiplicity of bi-cell detectors are arranged spaced from one another along a single line.

It is a still further object of the present invention to provide such a system in which each bi-cell detector has a rectangular aperture located thereabove at a prescribed spacing therefrom.

It is a still further object of the present invention to provide such a device designed to measure in two or three dimensions.

It is a still further object of the present invention to provide such a device which includes one linear array of detectors for each dimension of measurement contemplated with the arrays being mutually orthogonal.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
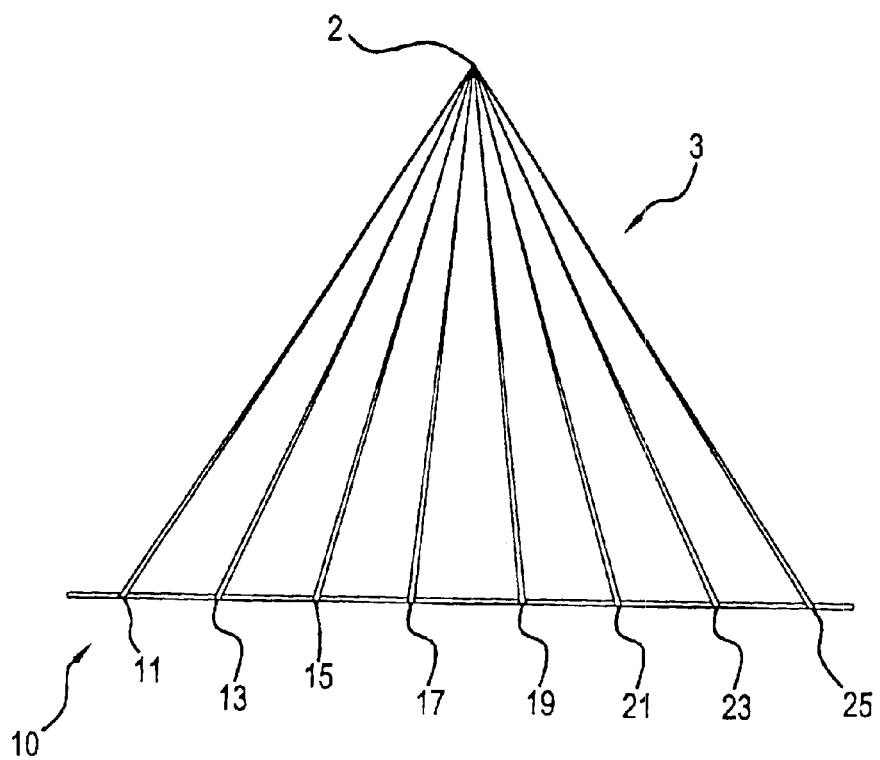
FIG. 1 shows a side view of a single linear detector array receiving light from a point source emitter in accordance with the teachings of a first embodiment of the present invention.

Reference is first made to FIGS. 1-4 for a description of a first embodiment of the present invention. With reference, first, to FIG. 1, a space is generally designated by the reference numeral 1 and has a point source emitter 2 located therein which emits light beams 3 as shown. Adjacent the space, a linear array 10 of detectors is located including the detectors 11, 13, 15, 17, 19, 21, 23 and 25, eight detectors, in all, in the embodiment shown.

Figure 2:
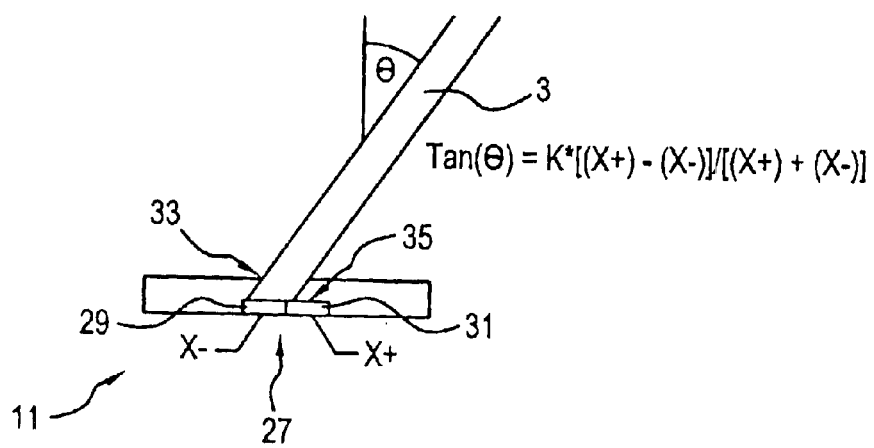
FIG. 2 shows an enlarged side view of one individual detector.
Figure 3:
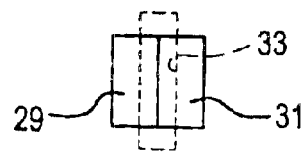
FIG. 3 shows a top view of one bi-cell detector with the superimposition of the rectangular aperture shown in phantom.

With reference to FIGS. 2 and 3, it is seen that the detector 11 (representative of the other detectors) consists of a bi-cell detector 27 having an active area 35 consisting of two adjacent detecting regions 29 and 31, with the region 29 being described as the "x−" region, and with region 31 being described as the "x+" region. As also seen in FIGS. 2 and 3, a rectangular aperture 33 is located above the bi-cell detector 27 so that the beam 3 of light is guided through the aperture 33 and onto the active area or surface 35 of the bi-cell detector 27.

As should be understood from comparison of FIGS. 1 and 2, the beams of light 3 emanating from the point source emitter 2 engage different locations on the active area 35 of each respective bi-cell detector 27 (each of the detectors 11, 13, 15, 17, 19, 21, 23 and 25 has a bi-cell detector 27 such as is shown in FIG. 2).

Due to the positions of each detector 11-25 spaced along the array 10, the angle θ, seen in FIG. 2, between the vertical and the beam 3 impinging on each detector is unique for each detector.

As should be understood by those skilled in the art, the x+ and x− halves of each detector 27 generate a photocurrent based upon the location of impingement of the beam 3 on the active surface or area thereof. In accordance with the teachings of the present invention, these photocurrents are used to measure the angle θ through calculation of the tangent of that angle in accordance with the following formula:

$$\mathrm{Tan}(\theta) = K \cdot \frac{[x+ \; -x-]}{[x+ \; +x-]}$$

In a manner well known to those skilled in the art, with the value of Tan(θ) known, the value of θ is easily discerned.

Figure 4:
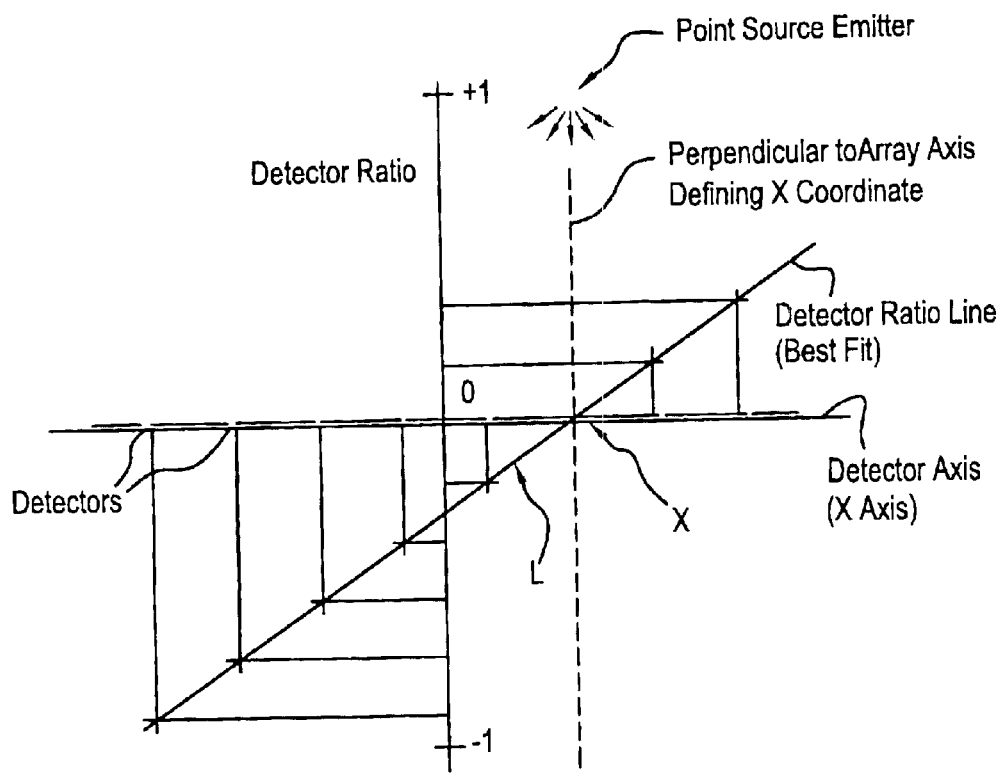
FIG. 4 shows a plot of the detector ratio versus detector position used to locate the source coordinate along the linear array.

With reference to FIG. 4, this figure shows a graph created by taking the best fit line through the Tan(θ) calculations for each detector. The point where the detector ratio is zero is designated by the reference letter "x" and also comprises the x-intercept. That location is, through calculation, the point of perpendicularity between the emitter 2 and the detector array 10. Again, computations resulting in the graph of FIG. 4 do not require determination of the angle of incidence of the light beams 3 directly but, rather, require determination of the tangent of the angle between the beams of light and each respective detector. Preferably, the best fit line L is computed as the line of regression where the summation of squared errors between the fit line and actual data points is minimized.

A key feature of the present invention is its ability to compute the line of regression L and hence the position of the point source emitter 2 even if a few of the detectors have an obstructed view of the emitter 2. Although only two of the detectors 11-25 need have an unobstructed view of the point source emitter 2 to provide adequate position determination results, the more of the detectors 11-25 that are unobstructed, the more accurate the line L will be, thereby resulting in a more accurate determination of the location of the point x.

Figure 5:
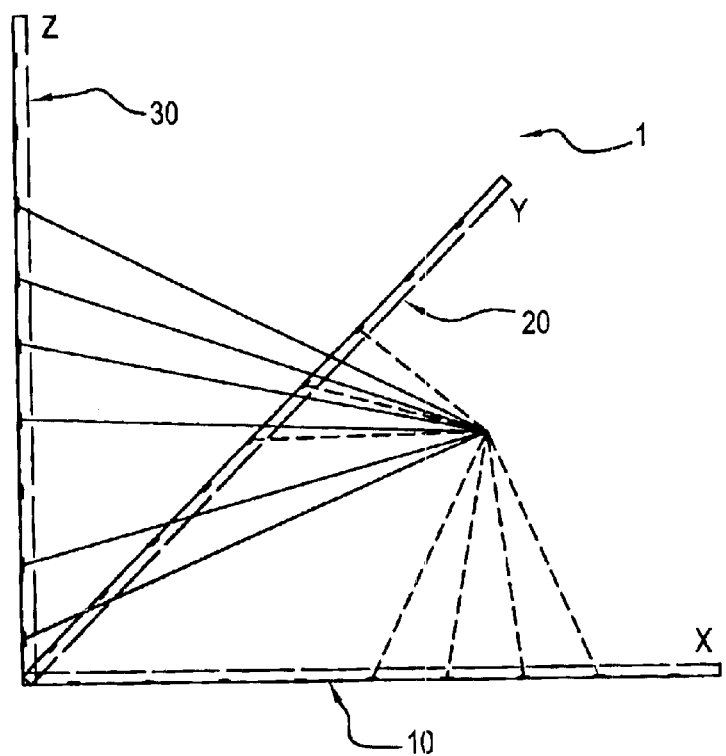
FIG. 5 shows a second embodiment of the present invention in which three mutually orthogonal linear arrays of detectors are employed to locate the position of a point source emitter in three dimensions and where each array has a plurality of detectors with an unobstructed view of the point source emitter.

FIG. 5 depicts a second embodiment of the present invention in which the detector array 10 is provided and additional arrays 20 and 30 are also provided that are substantially identical to the array 10 but extend mutually orthogonally. Thus, in FIG. 5, the array 10 is seen lying along the x axis of the space 1, the array 20 is seen lying along the y axis of the space 1, and the array 30 is seen lying along the z axis of the space 1.

FIG. 5 shows the emitter 2 emitting a point source of light in all directions within the space 1 with beams of light extending in all directions schematically represented therein. In the same manner as described hereinabove concerning the embodiment of FIGS. 1-3, each array 10, 20 and 30 facilitates calculation of an intercept where beams of light emanating from the emitter 2 cross the respective arrays perpendicularly thereto. Those perpendicular intersections define the x, y and z coordinates, respectively. In FIG. 5, the detectors of each array 10, 20 and 30 have unobstructed views of the emitter 2, and calculations of position by each array are accomplished by creating lines of regression as explained above with reference to FIG. 4.

As is the case with the embodiment of FIGS. 1-3, in the embodiment particularly shown in FIG. 5, only two detectors in each array are required to be in sight of the point source emitter 2 so that measurements can be made in each dimension x, y and z. Of course, the more detectors are exposed to the point source emitter 2, the more accurate the measurements of the perpendicular intercept across each array will be.

Figure 6:
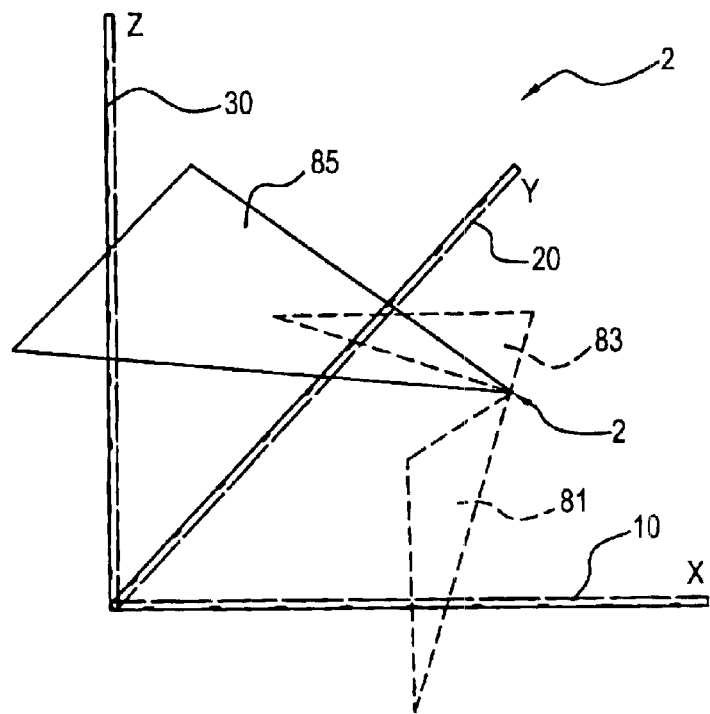
FIG. 6 shows the arrays as also shown in FIG. 5 with a light beam emanating from the point source of light and the plane intersection method employed to determine position where the view to some of the detectors from the emitter is obstructed.

A variation of the embodiment of FIG. 5 is shown in FIG. 6, and chooses an alternative approach to coordinate computation where at least one array has only one detector that has received valid data. In this case, the coordinates cannot be solved directly but, rather, the plane of incidence is determined for each detector axis. See FIG. 6, planes 81, 83 and 85. In the typical three dimensional application, a position solution can be made if each axis array has at least one such valid detector response. In such a case, the, solution becomes the intersection of the three planes of incidence. FIG. 6 depicts the plane construction 81, 83 and 85, and intersection and the emitter location. Where each array has at least two detectors in line of sight of the point source of light, the procedure described with reference to FIG. 5 may be employed, determining lines of regression across each array.

Figure 8:
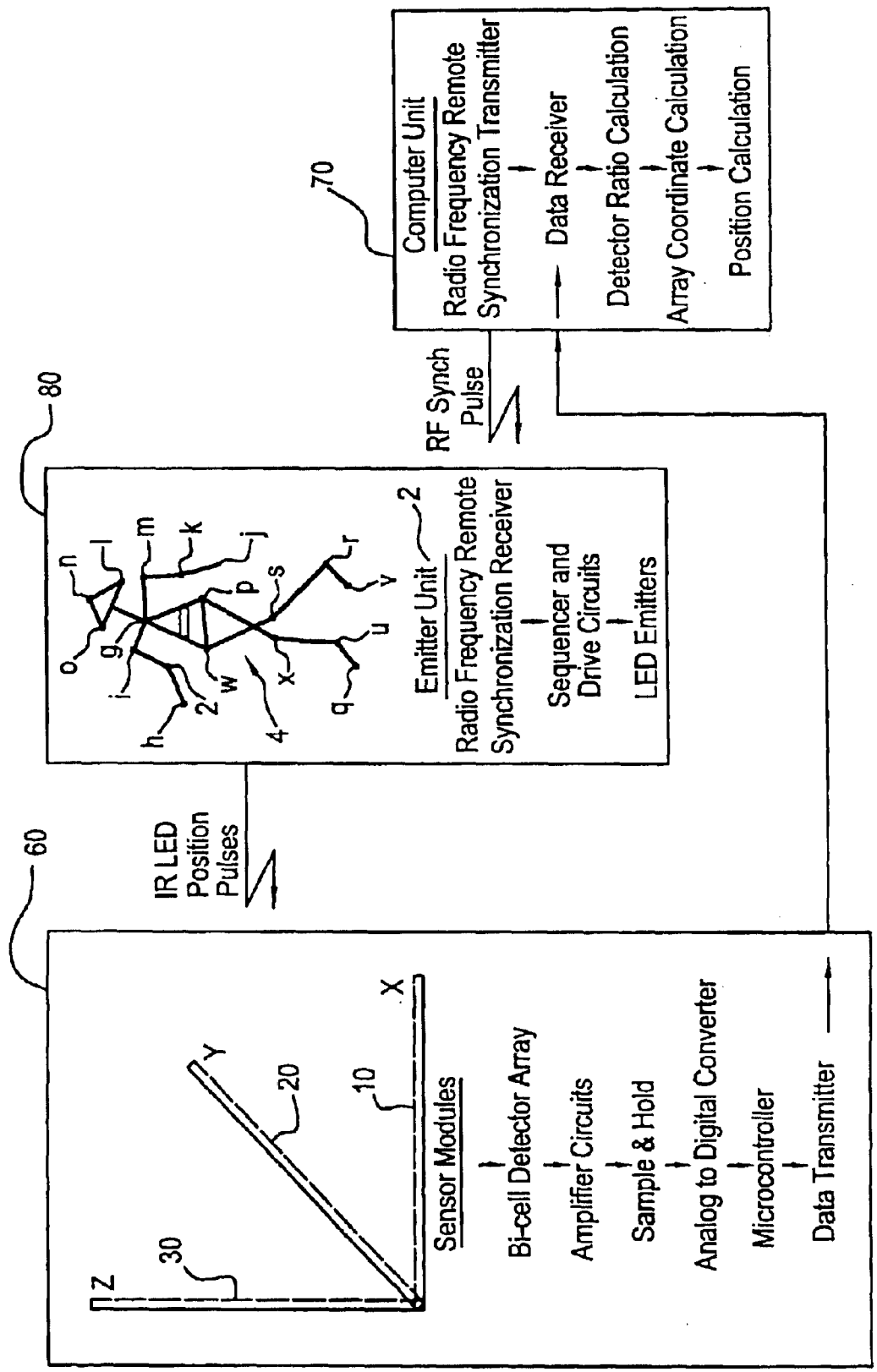
FIG. 8 shows a block diagram of the system of the three dimensional embodiment of the present invention.

With reference, now, to FIG. 8, a schematic representation of the typical system is seen. The box 60 contains a three dimensional sensor array with a linear array extending along the x, y and z axes. Each bi-cell detector array is connected to an amplifier circuit to amplify the photocurrents emitted from each bi-cell detector responsive to impingement of light beams thereon. Each such piece of data is sent to a sample and hold mechanism and then to an analog to digital converter which converts the analog signals to digital signals and then conveys them to a microcontroller, which then transmits data to a data receiver at the computer unit 70, which receives the data, calculates detector ratio and array coordinates by receiving data from all three arrays 10, 20 and 30, and calculates position of the point source emitter 2 in a manner well understood. The box 80 schematically depicts the point source emitter 2 mounted on a location on a person 4 along with a multiplicity of other point source emitters located at numerous joints and other locations and identified by reference letters g, h, i, j, k, l, m, n, o, p, q, r, s, t, u, v and w.

Also shown within the box 80 is a schematic representation of one emitter unit 2 which is controlled by a radio frequency remote synchronization receiver that conveys signals to a sequencer and drive circuits which control the point source emitters which may comprise light emitting diodes (LEDs).

Figure 7:
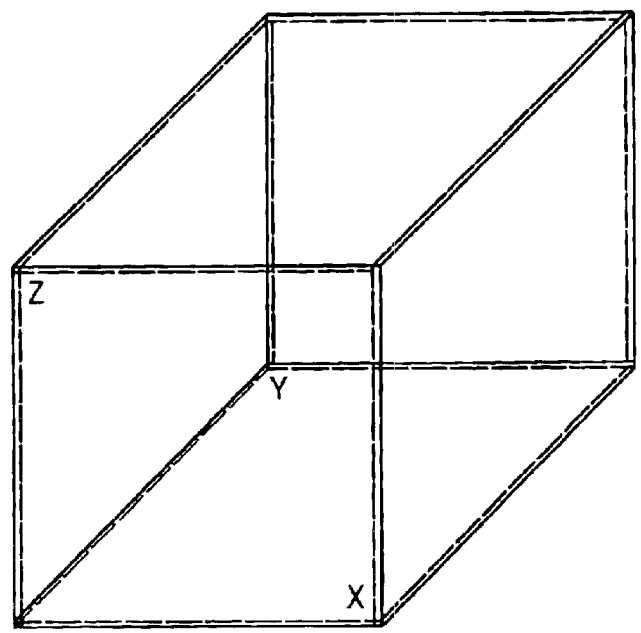
FIG. 7 shows a diagram of the frame arrangement used in the three dimensional applications of FIGS. 5 and 6.

In accordance with the teachings of the present invention, accurate calculations of the position of a point source emitter within a space may be accomplished in an inexpensive and highly accurate way. The inventive system in its second embodiment, best seen in FIGS. 5-7, may obtain the position of an object emitting light in three degrees of freedom.

Accordingly, an invention has been disclosed in terms of preferred embodiments thereof, which fulfill each and every one of the objects of the invention as set forth hereinabove, and provide a new and useful optical position measurement system employing one or more linear-detector arrays of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. An optical position measurement system, comprising:
   a) an elongated array of bi-cell optical detectors, said array including a plurality of bi-cell optical detectors linearly arranged along an axis at an edge of a measuring space, each detector having an active area facing said space, said active area comprising two adjacent light detecting regions;
   b) each detector having a slot located in spaced relation between said active area and said space; and
   c) a plurality of point sources of light within said space;
   d) whereby light emanating from said sources passes through each slot and impinges upon each said active area; and
   e) computer means receiving signals from said detectors representative of a location of impingement of light on the active area of each detector, said computer calculating a perpendicular intercept across said axis of said point source.

2. The system of claim 1, wherein each slot is rectangular.

3. The system of claim 1, wherein said array includes at least 3 bi-cell optical detectors.

4. The system of claim 1, wherein said array includes 8 bi-cell optical detectors.

5. The system of claim 1, wherein said elongated array comprises a first array, said system further including a second array of bi-cell optical detectors, said second array including a plurality of bi-cell optical detectors linearly arranged along an axis perpendicular to said axis of said first array, said second array axis being located at another edge of said space.

6. The system of claim 5, wherein each slot is rectangular.

7. The system of claim 5, wherein each array includes at least 3 bi-cell optical detectors.

8. An optical position measurement system, comprising:
   a) first, second and third arrays of bi-cell optical detectors arranged mutually orthogonally at respective edges of a measuring space, each array including a plurality of bi-cell optical detectors linearly arranged along an axis, each detector having an active area facing said space, said active area comprising two adjacent light detecting regions;
   b) each detector having a slot located in spaced relation between said active area and said space; and
   c) at least one point source of light within said space;
   d) whereby light emanating from said source passes through each slot and impinges upon each said active area; and
   e) computer means receiving signals from said detectors representative of a location of impingement of light on the active area of each detector, and, therefrom, calculating a location of said point source.

9. The system of claim 8, wherein each slot is rectangular.

10. The system of claim 8, wherein each array includes at least 3 bi-cell optical detectors.

11. The system of claim 8, wherein said at least one point source of light comprises a plurality of point sources of light.

12. The system of claim 9, wherein each array includes at least 3 bi-cell optical detectors.

13. The system of claim 8, wherein said computer means includes means for calculating lines of regression crossing each array, where each array includes at least two bi-cell optical detectors in line of sight with a said at least one point source of light.

14. The system of claim 8, wherein said computer means includes means for calculating planes of incidence crossing each array, where at least one array includes no more than one bi-cell optical detector in line of sight with a said at least one point source of light.

15. An optical position measurement system, comprising:
   a) a three-dimensional measuring space having x, y and z axes at mutually orthogonal edges thereof, each axis including at least one bi-cell optical detector located thereon, each detector having an active area facing said space, said active area comprising two adjacent light detecting regions;
   b) each detector having a slot located in spaced relation between said active area and said space; and
   c) at least one point source of light within said space;
   d) whereby light emanating from said source passes through each slot and impinges upon each said active area; and
   e) computer means receiving signals from said detectors representative of a location of impingement of light on the active area of each detector, and, therefrom, calculating a location of said point source.

16. The system of claim 15, wherein each slot is rectangular.

17. The system of claim 15, wherein said at least one point source of light comprises a plurality of point sources of light.

18. An optical position measurement system, comprising:
 a) an elongated array of bi-cell optical detectors, said array including at least three bi-cell optical detectors linearly arranged along an axis at an edge of a measuring space, each detector having an active area facing said space, said active area comprising two adjacent light detecting regions;
 b) each detector having a slot located in spaced relation between said active area and said space; and
 c) a plurality of point sources of light within said space;
 d) whereby light emanating from said sources passes through each slot and impinges upon each said active area; and
 e) computer means receiving signals from said detectors representative of a location of impingement of light on the active area of each detector, said computer calculating a perpendicular intercept across said axis of said point source.

19. An optical position measurement system, comprising:
 a) a first elongated array of bi-cell optical detectors, said first array including a plurality of bi-cell optical detectors linearly arranged along an axis at one edge of a measuring space, each detector having an active area facing said space, said active area comprising two adjacent light detecting regions;
 b) a second array of bi-cell optical detectors, said second array including a plurality of bi-cell optical detectors linearly arranged along an axis perpendicular to said axis of said first array, said second array axis being located at another edge of said space;
 c) each detector having a slot located in spaced relation between said active area and said space; and
 d) at least one point source of light within said space;
 e) whereby light emanating from said source passes through each slot and impinges upon each said active area; and
 e) computer means receiving signals from said detectors representative of a location of impingement of light on the active area of each detector, said computer calculating a perpendicular intercept across said axis of said point source.

* * * * *